US010763934B2

(12) United States Patent
Chen et al.

(10) Patent No.: US 10,763,934 B2
(45) Date of Patent: Sep. 1, 2020

(54) REFERENCE SIGNAL INFORMATION FEEDBACK METHOD, DEVICE AND TERMINAL (71) Applicant: ZTE CORPORATION, Shenzhen, Guangdong Province (CN)

(72) Inventors: Yijian Chen, Shenzhen (CN); Zhaohua Lu, Shenzhen (CN); Yu Ngok Li, Shenzhen (CN); Huahua Xiao, Shenzhen (CN); Jing Zhao, Shenzhen (CN); Yuxin Wang, Shenzhen (CN)

(73) Assignee: ZTE CORPORATION (CN)

( * ) Notice: Subject to any disclaimer, the term of this patent is extended or adjusted under 35 U.S.C. 154(b) by 73 days.

(21) Appl. No.: 15/511,248

(22) PCT Filed: Apr. 10, 2015

(86) PCT No.: PCT/CN2015/076311
§ 371 (c)(1),
(2) Date: Jul. 13, 2017

(87) PCT Pub. No.: WO2016/041345
PCT Pub. Date: Mar. 24, 2016

(65) Prior Publication Data
US 2017/0317731 A1 Nov. 2, 2017

(30) Foreign Application Priority Data

Sep. 15, 2014 (CN) .......................... 2014 1 0469391

(51) Int. Cl.
*H04B 7/00* (2006.01)
*H04B 7/06* (2006.01)
(Continued)

(52) U.S. Cl.
CPC ............. *H04B 7/0619* (2013.01); *H04B 7/04* (2013.01); *H04B 7/0417* (2013.01); *H04L 5/005* (2013.01);
(Continued)

(58) Field of Classification Search
CPC ............. H04W 52/0245; H04W 72/04; H04W 72/0406; H04W 72/042; H04W 72/1278
(Continued)

(56) References Cited

U.S. PATENT DOCUMENTS 8,953,700 B2 *  2/2015  Kang .................... H04B 7/024
                                                      370/230
9,084,272 B2 *  7/2015  Lee ....................... H04L 1/0045
(Continued)

FOREIGN PATENT DOCUMENTS

CN      1859056 A     11/2006
CN    102142918 A      8/2011

OTHER PUBLICATIONS

Office Action dated Jan. 6, 2020 for Chinese Patent Application No. 201410469391.1 and English Translation.
(Continued)

*Primary Examiner* — Dmitry Levitan
(74) *Attorney, Agent, or Firm* — McDonald Hopkins LLC (57) ABSTRACT

Embodiments of the present disclosure provide a reference signal information feedback method, apparatus and terminal. The method includes: a terminal determines a reference signal parameter of an uplink measurement reference signal and/or a downlink measurement reference signal, and the terminal feeds the determined reference signal parameter back to a base station.

10 Claims, 4 Drawing Sheets

(51) Int. Cl.
*H04B 7/04* (2017.01)
*H04W 72/04* (2009.01)
*H04L 5/00* (2006.01)
*H04B 7/0417* (2017.01)
*H04W 24/10* (2009.01)

(52) U.S. Cl.
CPC .......... *H04L 5/0007* (2013.01); *H04L 5/0048* (2013.01); *H04L 5/0051* (2013.01); *H04W 24/10* (2013.01); *H04W 72/04* (2013.01)

(58) Field of Classification Search
USPC ................ 370/310, 328, 329, 334, 349, 465
See application file for complete search history.

(56) References Cited

U.S. PATENT DOCUMENTS

| | | | | |
|---|---|---|---|---|
| 9,191,256 | B2* | 11/2015 | Vojcic | H03M 13/373 |
| 9,219,534 | B2* | 12/2015 | Kang | H04B 7/024 |
| 9,252,930 | B2* | 2/2016 | Qu | H04L 5/0023 |
| 9,398,539 | B2* | 7/2016 | Kang | H04B 7/0473 |
| 9,497,798 | B2* | 11/2016 | Kazmi | H04W 88/06 |
| 9,532,256 | B2* | 12/2016 | Ariyavisitakul | H04B 7/0452 |
| 9,538,515 | B2* | 1/2017 | Papasakellariou | H04W 72/042 |
| 9,578,603 | B2* | 2/2017 | Liu | H04W 52/40 |
| 9,590,713 | B2* | 3/2017 | Davydov | H04L 5/00 |
| 9,716,539 | B2* | 7/2017 | Kim | H04L 1/20 |
| 9,768,930 | B2* | 9/2017 | Park | H04L 5/0014 |
| 10,104,649 | B2* | 10/2018 | Kim | H04B 7/068 |
| 2008/0051125 | A1 | 2/2008 | Muharemovic et al. | |
| 2013/0051321 | A1* | 2/2013 | Barbieri | H04B 7/0626 370/328 |
| 2013/0107832 | A1* | 5/2013 | Kim | H04B 7/024 370/329 |
| 2014/0092877 | A1 | 4/2014 | Kazmi et al. | |
| 2014/0153625 | A1 | 6/2014 | Vojcic et al. | |
| 2016/0204910 | A1* | 7/2016 | Kim | H04B 17/318 370/252 |

OTHER PUBLICATIONS

Office Action dated Aug. 7, 2018 for European Patent Application No. 15841762.6.
Office Action dated Oct. 24, 2019 for European Patent Application No. 15841762.6.
Office Action dated Feb. 15, 2019 for European Patent Application No. 15841762.6.
Office Action dated Dec. 17, 2019 for European Patent Application No. 15841762.6.

* cited by examiner

REFERENCE SIGNAL INFORMATION FEEDBACK METHOD, DEVICE AND TERMINAL

TECHNICAL FIELD

The present disclosure relates to the field of communications, and more particularly to a reference signal information feedback method, apparatus and terminal in the field of wireless communications.

BACKGROUND

In a wireless communication system, a transmitting end usually uses multiple antennae to acquire a higher transmission rate. The multiple antennae can lead to signal-to-noise ratio improvement and support more spatial multiplexing layers. Compared with an open-loop Multi-Input Multi-Output (MIMO) technology where the transmitting end does not use Channel State Information, CSI, a closed-loop MIMO precoding technology using the CSI information will be higher in capacity, and is a transmission technology widely used by current mainstream 4G standards. The core idea of the closed-loop MIMO precoding technology refers to that a receiving end feeds channel information back to the transmitting end, and the transmitting end uses some transmitting precoding technologies according to the obtained channel information, thereby greatly improving the transmission performance. For single-user MIMO, a precoding vector relatively matched with channel feature vector information may be directly used for transmitting precoding. For multi-user MIMO, more accurate channel information is also needed to perform interference elimination. Therefore, acquisition of the channel information of the transmitting end plays an important role.

In some 4G technologies such as a Long Term Evolution/Long Term Evolution-Advanced, LTE/LTE-A, 802.16m standard specification, downlink channel information of a Frequency Division Duplexing, FDD, system is acquired by using a general flow as follows.

In step S1, a transmitting end (base station) transmits downlink Channel State Information-Reference Signals (CSI-RSs) to a receiving end. Generally speaking, each antenna transmits a portion of CSI-RSs. CSI-RSs transmitted by different antennae are staggered in positions of a time frequency domain or code domain, which can keep the orthogonality from mutual interference. Each antenna corresponds to a CSI-RS port, and a channel measurement reference signal is used for measuring channel information. In LTE-A, transmission of CSI-RSs via a maximum 8-antenna port of a base station side is supported. The base station also transmits related position information and transmitting period information of a Radio Resource Control, RRC, signaling configuration CSI-RS to a terminal. Transmitting contents of a reference signal at the base station side are determined according to some pre-appointed rules, and the terminal can accurately learn of transmitting content of the reference signal at each port of the base station side at each time frequency position.

In step S2, the terminal receives configuration information of the CSI-RS transmitted by the base station side, and the terminal receives and detects CSI-RS at transmitting time frequency resource positions of multiple reference signal ports informed by signaling. The received CSI-RS is obtained on each receiving antenna of the terminal side. Since the terminal and the base station appoint contents of the reference signal transmitting signals at multiple time frequency resource positions of multiple transmitting ports, the terminal can accurately learn of downlink reference signal transmitting signals. Therefore, the terminal may perform downlink channel estimation according to the received reference signal to obtain downlink channel response information between a terminal-side receiving antenna port and a base station-side transmitting antenna port. During downlink channel estimation, it is necessary to consider influences of noise and interference mixed into the actual signal during receiving of the reference signal, a Least Square, LS, algorithm, a Minimum Mean Square Error, MMSE algorithm, an Interference Rejection Combining, IRC, algorithm and other algorithms may be adopted to perform channel estimation, and a downlink channel matrix matched with the number of transmitting ports at multiple time frequency resource positions is obtained finally.

In step S3, the terminal may estimate a channel response between a receiving antenna and multiple transmitting antenna ports according to contents of the transmitting signals for reference signals at multiple reference signal ports and receiving reference signals on multiple receiving antennae. That is, channel matrix corresponding to multiple time frequency resource positions may be obtained, and optimal CSI information may be further calculated according to the channel matrices. The CSI generally includes three types of information, namely a Precoding Matrix Indicator (PMI), Channel Quality Indicator (CQI), and Rank Indicator (RI). The three types of information feed back and recommend a precoding matrix, channel quality information and number of transmission layers to the base station respectively. The terminal feeds the calculated CQI/PMFRI information back to the base station via a control channel of an uplink physical layer or a data channel of the uplink physical layer. The base station determines the number of transmission layers, a coding modulation mode and transmitting precoding on the basis of the feedback information of the terminal.

It can be observed that the downlink CSI-RS plays a very important role in a CSI acquisition process, and generally influences the accuracy of the precoding information, the channel quality information and information about the number of transmission layers, and further significantly influences the transmission performance of MIMO.

Downlink CSI-RS s adopted in the 4G standard are all periodic CSI-RSs. In the time domain, in view of that a channel is not suddenly changed, the change has a certain time domain relevancy and the related time length is longer than a subframe duration 1 ms, therefore, it is unnecessary to transmit all subframes. All User Equipments UEs may share the CSI-RS, therefore the CSI-RS is transmitted periodically in general. The concept of a periodic reference signal is that the base station transmits the CSI-RS s at a certain periodic interval, and a transmitting position may have different subframe position offsets. For example, a CSI-RS period and a subframe offset in LTE-A are defined as follows.

A specification in an LTE standard 36.211 is as shown in Table 1, i.e., CSI-RS subframe configuration.

TABLE 1

CSI-RS subframe configuration

| CSI-RS-SubframeConfig $I_{CSI-RS}$ | CSI-R Speriodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Figure 1:
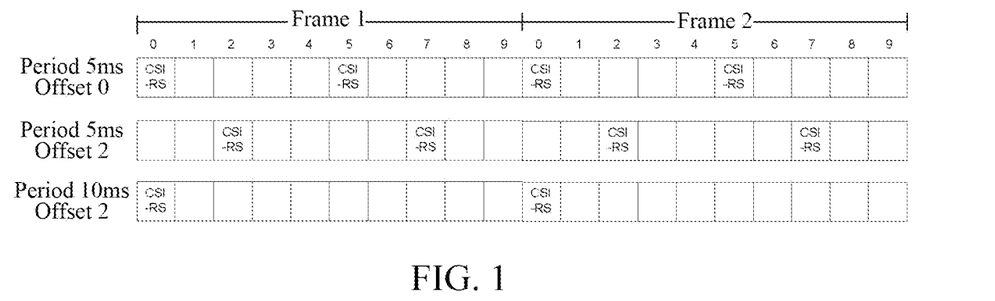
FIG. 1 is a transmitting diagram of a subframe position corresponding to a CSI-RS configuration example.

In Table 1, $I_{CSI-RS}$ is a configuration parameter of the CSI-RS, of which the value ranges from 0 to 154. Different values correspond to different CSI-RS periods and subframe offsets. FIG. 1 shows a transmitting diagram of subframe positions corresponding to some CSI-RS configuration examples, i.e., corresponding respectively to configurations of $I_{CSI-RS}=0$, $I_{CSI-RS}=2$ and $I_{CSI-RS}=5$.

Figure 2:
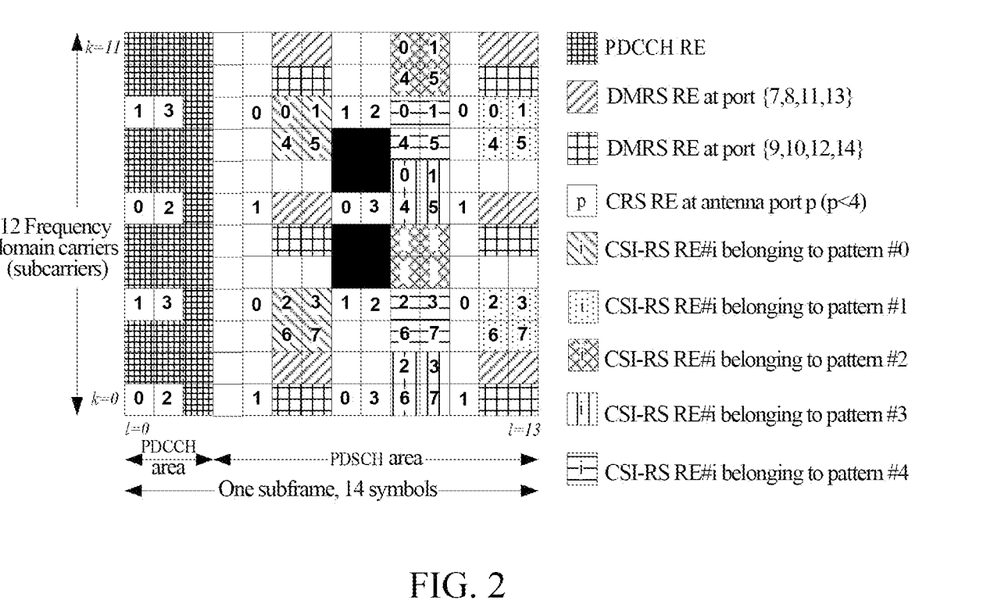
FIG. 2 is a diagram of a CSI-RS Pattern in LTE.

At a frequency domain position, a CSI-RS exists inside each Physical Resource Block pair, and transmitting patterns of the same port inside different PRB pairs are the same. A pattern of the CSI-RS is as shown in FIG. 2. The PRB pairs may refer to the specification in the LTE standard 36.211, typically including 12 frequency domain subcarriers and 14 time domain Orthogonal Frequency Division Multiplexing (OFDM) symbols.

In an LTE system, it is specified that 40 Resource Elements, REs, in one PRB pair may be used as CSI-RSs and are divided into 5 patterns, and each pattern includes 8 REs, as shown in the above figure. Each port of the CSI-RS reference signal occupies an RE in one PRB pair averagely, and all ports belonging to one CSI-RS resource are required to be limited within a pattern #i as shown in FIG. 2. At present, a CSI-RS supports 8 ports maximally. Therefore, when the number of ports is 8, there are 5 candidate positions. When the number of ports is 4, there are 10 configurable positions. When the number of ports is 2, there are 20 configurations.

Figure 3:
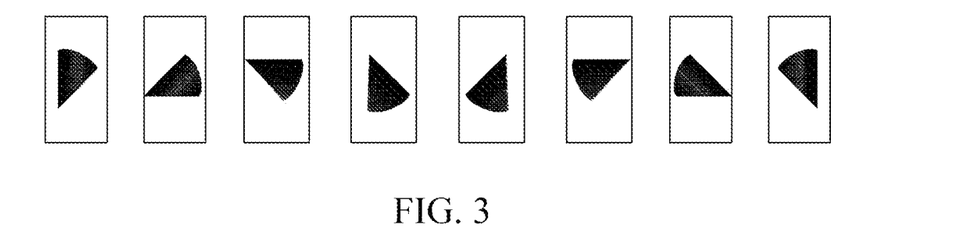
FIG. 3 is a diagram of a periodic beam measurement reference signal.

When a base station in an LTE-A system transmits a CSI-RS, precoding process cannot be performed generally in the existing art. The main reason is that multiple UEs in a cell share the CSI-RS, and if precoding is to be performed on the CSI-RS, precoding can be performed only based on features of a channel between the base station and a UE, which may influence measurements of other UEs, that is, other UEs cannot accurately measure a physical channel between Nr receiving antennae and Nt transmitting antennae, and precoding performed based on features of other UE channels will make it unable to accurately calculate and report own CSI. Certainly, in a large-scale antenna communication system discussed currently, when there are quite a few antennae, to save the reference signal overhead and reduce the feedback complexity to the greatest extent, in some scenarios where a multi-path scattering ratio is relatively low, the base station may transmit a periodic precoding CSI-RS, and a precoded CSI-RS is called as a beam measurement reference signal generally. FIG. 3 shows a transmitting policy for a periodic beam reference signal, and energy of each beam reference signal is centralized in a certain direction to form a directional beam, and a beam measurement reference signal is transmitted at a time period interval. A polling is performed among a group of beam reference signals.

In addition to the periodic CSI-RS reference signal described above, a non-periodic CSI-RS reference signal is recently proposed. The non-periodic CSI-RS is an instant trigger reference signal, which is dynamically transmitted for channel measurement of a specific UE or UE group in general, and cannot be continuously transmitted and only exists in a subframe. Therefore, non-periodic reference signal trigger information is carried in a Physical Downlink Control Channel (PDCCH) or an Enhanced-PDCCH (ePDCCH).

After learning of a transmitting position of the non-periodic CSI-RS, the terminal may perform the reference signal detection at the corresponding position. Like the periodic CSI-RS, the transmitting content of the non-periodic CSI-RS may be pre-acquired by the terminal. Therefore, a downlink channel response between a terminal receiving antenna and a base station transmitting antenna may be estimated, thereby acquiring a channel matrix.

Figure 4:
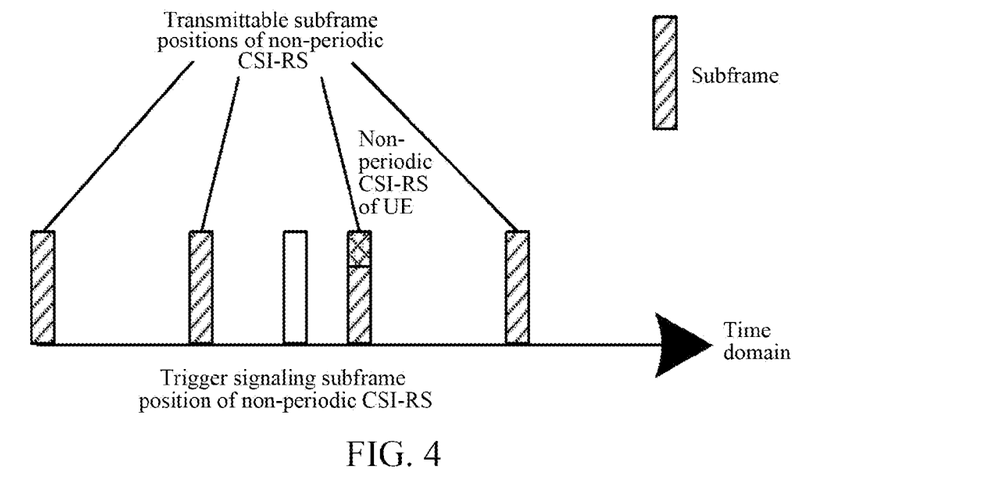
FIG. 4 is a diagram of a non-periodic CSI-RS time frequency domain position.

There are two typical non-periodic reference signal transmitting modes. One transmitting mode is transmission in a Physical Downlink Shared Channel (PDSCH) of a user needing to use a non-periodic CSI-RS for measurement. The other transmitting mode is that a non-periodic CSI-RS contention resource pool is allocated to all users in a cell and then resources are configured to different users based on the basis of the resource pool. As shown in FIG. 4, the non-periodic CSI-RS contention resource pool may be a set of transmitting resource positions of periodic CSI-RS.

It is observed that the non-periodic CSI-RS is generally oriented to a specific user or a specific user group instead of all users in the cell. Therefore, the non-periodic CSI-RS may support a precoding manner, and can effectively decrease the number of ports, and may further reduce the calculation amount of CSI feedback. Thus, the non-periodic CSI-RS may select to be transmitted in a precoding beam reference signal form or a non-precoding non-beam reference signal form as required.

Some basic knowledge about measurement reference signal transmission in the existing art was introduced above, including precoding reference signals for periodic reference signals and non-periodic reference signals and non-precoding reference signals. In the existing art, all parameters related to reference signals are determined and configured to the terminal by the base station, or the terminal and the base station make some appointments to adopt relatively fixed parameters.

As for a Time Division Duplexing (TDD) system, downlink channel information is mainly acquired in a reciprocity manner. A general flow for acquiring the downlink channel information of the TDD system is as follows.

In step B1, the base station configures Sounding Reference Signals (SRSs) for channel information measurement, and the base station may inform the terminal of related SRS transmitting information such as an SRS transmitting position, a transmitting period and a frequency domain occupation bandwidth via a PDCCH signaling or a high-layer RRC signaling.

In step B2, the terminal receives a configuration signaling transmitted by the base station, and transmits an SRS reference signal on a resource indicated by the base station according to a method indicated by the base station. The base station and the terminal appoint the transmitting signal content of SRSs at multiple time frequency resource positions.

In step B3, the base station receives SRS reference signal at SRS transmitting positions of multiple UEs. Since the base station can accurately learn of SRS transmitting signals, the base station may perform channel estimation according to the received reference signals to obtain uplink channel response information between a base station-side receiving antenna port and a terminal-side transmitting antenna port. During channel estimation, it is necessary to consider actual influences of noise and interference doped during receiving of the reference signal, an LS algorithm, an MMSE algorithm, an IRC algorithm and other algorithms may be adopted to perform estimation, and an uplink channel matrix matched with the number of transmitting ports at multiple time frequency resource positions is obtained finally.

In step B4, the base station performs channel reciprocity according to the obtained uplink channel matrix between the base station-side receiving antenna and the terminal-side transmitting antenna, to obtain a downlink channel matrix between a base station-side transmitting antenna and a terminal-side receiving antenna. Information such as pre-coding, channel quality, the number of transmission layers and so on, may be judged according to the downlink channel matrix.

It can be observed that the SRS plays a very important role in an uplink/downlink state information acquisition process, and generally influences the accuracy of the pre-coding information, the channel quality information and information about the number of transmission layers, and further significantly influences the transmission performance of MIMO.

The SRS is a reference signal transmitted by each terminal and used for measuring related channel information of the present terminal, and is a measurement reference signal of a specific characteristic of a UE rather than a reference signal shared by multiple users. Therefore, the SRS may be a precoding beam reference signal or may be a non-precoding non-beam measurement reference signal, and may be determined according to measurement demands, channel features and the like specifically.

In the LTE-A standard, the SRS is mainly designed on the basis of a multiple access mode of Single-Carrier Frequency-Division Multiple Access (SC-FDMA) at present. Under the limitation of a single-carrier characteristic of LTE-A uplink SC-FDMA, an uplink peak-to-average ratio and the like, the design of the SRS is greatly different from that of the downlink CSI-RS. A future uplink system may adopt an Orthogonal Frequency Division Multiple Access (OFDMA) mode, and therefore the design of the SRS may be considered to be similar to that of a downlink measurement reference signal.

The problem in the existing art is that: regardless of transmission of the CSI-RS or the SRS, the terminal does not participate in a reference signal parameter determination process, and the parameter is completely determined by the base station. As for the periodic reference signal, in a general traditional scenario, the method may not be extremely obvious in performance loss. But, in a scenario of the presence of some special users or special demands, including a terminal having severe delay demands, robustness demands and CSI quantization precision demands, or in a scenario where the interference is very large and there are many users, since the total perception of the base station for measurement reference signal demands is poorer than that of the terminal, no participation of the terminal in determination of the reference signal parameter will bring the system performance loss. Particularly for the non-periodic reference signal, the terminal has a more urgently demand to participate in determination of the reference signal parameter.

SUMMARY

An embodiment of the present disclosure provides a reference signal information feedback method, which includes:

a terminal determines a reference signal parameter of an uplink measurement reference signal and/or a downlink measurement reference signal; and the terminal feeds the determined reference signal parameter back to a base station.

In an exemplary embodiment, the reference signal parameter includes one or more of the following: a transmitting period or subframe offset of the uplink measurement reference signal and/or the downlink measurement reference signal; a transmitting density of the uplink measurement reference signal and/or the downlink measurement reference signal; a transmitting power of the uplink measurement reference signal and/or the downlink measurement reference signal; a transmitting position of the uplink measurement reference signal and/or the downlink measurement reference signal; a number of transmitting ports of the uplink measurement reference signal and/or the downlink measurement reference signal; port identifier selection information for transmitting the uplink measurement reference signal and/or the downlink measurement reference signal; precoding information corresponding to a port of the uplink measurement reference signal and/or the downlink measurement reference signal; attribute configuration of a periodic or non-periodic reference signal of the uplink measurement reference signal and/or the downlink measurement reference signal; and attribute configuration of a precoding or non-precoding reference signal of the uplink measurement reference signal or the downlink measurement reference signal.

In an exemplary embodiment, the transmitting density of the uplink measurement reference signal and/or the downlink measurement reference signal includes: a transmitting density or bandwidth of a Resource Block, RB, of the uplink measurement reference signal and/or the downlink measurement reference signal; or a transmitting density of the uplink measurement reference signal and/or the downlink measurement reference signal in an RB.

In an exemplary embodiment, the transmitting position of the uplink measurement reference signal and/or the downlink measurement reference signal includes any one of the following: an RB transmitting position of the uplink measurement reference signal and/or the downlink measurement reference signal; a transmitting position of the uplink measurement reference signal and/or the downlink measurement reference signal in an RB; and a transmitting time domain position of the uplink measurement reference signal and/or the downlink measurement reference signal.

In an exemplary embodiment, when the reference signal parameter includes the subframe offset and/or transmitting position of the uplink measurement reference signal and/or the downlink measurement reference signal, the step that the terminal determines the reference signal parameter of the uplink measurement reference signal and/or the downlink measurement reference signal includes that: the terminal determines a low-interference reference signal parameter in alternative reference signal parameters of the uplink measurement reference signal and/or the downlink measurement reference signal according to a channel interference condition.

In an exemplary embodiment, when the reference signal parameter includes the transmitting period of the uplink measurement reference signal and/or the downlink measurement reference signal, the step that the terminal determines the reference signal parameter of the uplink measurement reference signal and/or the downlink measurement reference signal includes that: the terminal determines the transmitting period of the uplink measurement reference signal and/or the downlink measurement reference signal according to a current movement speed or signal-to-noise ratio.

In an exemplary embodiment, when the reference signal parameter includes the transmitting power of the uplink measurement reference signal and/or the downlink measurement reference signal, the step that the terminal determines the reference signal parameter of the uplink measurement reference signal and/or the downlink measurement reference signal includes that: the terminal determines the reference signal parameter of the uplink measurement reference signal and/or the downlink measurement reference signal according to a channel condition.

In an exemplary embodiment, when the reference signal parameter includes the transmitting density of the uplink measurement reference signal and/or the downlink measurement reference signal, the step that the terminal determines the reference signal parameter of the uplink measurement reference signal and/or the downlink measurement reference signal includes that: the terminal selects a density of a PRB pair or density of an RE in the PRB pair according to a current frequency selective fading condition or a related bandwidth.

In an exemplary embodiment, when the reference signal parameter includes the transmitting time domain position of the uplink measurement reference signal and/or the downlink measurement reference signal, the step that the terminal determines the reference signal parameter of the uplink measurement reference signal and/or the downlink measurement reference signal includes that: the terminal determines a transmitting subframe position of the non-periodic reference signal according to a time varying speed of a channel and/or calculation capability of the terminal.

In an exemplary embodiment, when the reference signal parameter includes the number of the transmitting ports of the uplink measurement reference signal and/or the downlink measurement reference signal, the step that the terminal determines the reference signal parameter of the uplink measurement reference signal and/or the downlink measurement reference signal includes that: the terminal determines the number of the transmitting ports of the uplink measurement reference signal and/or the downlink measurement reference signal according to trade-off of reference signal overhead and performance.

Another embodiment of the present disclosure provides a reference signal information feedback apparatus, which is arranged on a terminal and includes a parameter determination module and a feedback module.

The parameter determination module is arranged to determine a reference signal parameter of an uplink measurement reference signal and/or a downlink measurement reference signal.

The feedback module is arranged to feed the determined reference signal parameter back to a base station.

In an exemplary embodiment, the reference signal parameter includes one or more of the following: a transmitting period or subframe offset of the uplink measurement reference signal and/or the downlink measurement reference signal; a transmitting density of the uplink measurement reference signal and/or the downlink measurement reference signal; a transmitting power of the uplink measurement reference signal and/or the downlink measurement reference signal; a transmitting position of the uplink measurement reference signal and/or the downlink measurement reference signal; a number of transmitting ports of the uplink measurement reference signal and/or the downlink measurement reference signal; port identifier selection information for transmitting the uplink measurement reference signal and/or the downlink measurement reference signal; precoding information corresponding to a port of the uplink measurement reference signal and/or the downlink measurement reference signal; attribute configuration of a periodic or non-periodic reference signal of the uplink measurement reference signal and/or the downlink measurement reference signal; and attribute configuration of a precoding or non-precoding reference signal of the uplink measurement reference signal or the downlink measurement reference signal.

In an exemplary embodiment, the transmitting density of the uplink measurement reference signal and/or the downlink measurement reference signal includes: a transmitting density or bandwidth of RBs of the uplink measurement reference signal and/or the downlink measurement reference signal; or a transmitting density of the uplink measurement reference signal and/or the downlink measurement reference signal in an RB.

In an exemplary embodiment, the transmitting position of the uplink measurement reference signal and/or the downlink measurement reference signal includes any one of the following: an RB transmitting position of the uplink measurement reference signal and/or the downlink measurement reference signal; a transmitting position of the uplink measurement reference signal and/or the downlink measurement reference signal in an RB; and a transmitting time domain position of the uplink measurement reference signal and/or the downlink measurement reference signal.

In an exemplary embodiment, when the reference signal parameter includes the subframe offset and/or transmitting position of the uplink measurement reference signal and/or the downlink measurement reference signal, the operation that the parameter determination module determines the reference signal parameter of the uplink measurement reference signal and/or the downlink measurement reference signal refers to that: the parameter determination module determines a low-interference reference signal parameter in alternative reference signal parameters of the uplink measurement reference signal and/or the downlink measurement reference signal according to a channel interference condition.

In an exemplary embodiment, when the reference signal parameter includes the transmitting period of the uplink measurement reference signal and/or the downlink measurement reference signal, the operation that the parameter determination module determines the reference signal parameter of the uplink measurement reference signal and/or the downlink measurement reference signal refers to that: the parameter determination module determines the transmitting period of the uplink measurement reference signal and/or the downlink measurement reference signal according to a current movement speed or signal-to-noise ratio.

In an exemplary embodiment, when the reference signal parameter includes the transmitting power of the uplink measurement reference signal and/or the downlink measurement reference signal, the operation that the parameter determination module determines the reference signal parameter of the uplink measurement reference signal and/or the downlink measurement reference signal refers to that: the parameter determination module determines the reference signal parameter of the uplink measurement reference signal and/or the downlink measurement reference signal according to a channel condition.

In an exemplary embodiment, when the reference signal parameter includes the transmitting density of the uplink measurement reference signal and/or the downlink measurement reference signal, the operation that the parameter determination module determines the reference signal parameter of the uplink measurement reference signal and/or the downlink measurement reference signal refers to that: the parameter determination module selects a density of a PRB pair or density of an RE in the PRB pair according to a current frequency selective fading condition or a related bandwidth.

In an exemplary embodiment, when the reference signal parameter includes the transmitting time domain position of the uplink measurement reference signal and/or the downlink measurement reference signal, the operation that the parameter determination module determines the reference signal parameter of the uplink measurement reference signal and/or the downlink measurement reference signal refers to that: the parameter determination module determines a transmitting subframe position of the non-periodic reference signal according to a time varying speed of a channel and/or calculation capability of the parameter determination module.

In an exemplary embodiment, when the reference signal parameter includes the number of the transmitting ports of the uplink measurement reference signal and/or the downlink measurement reference signal, the operation that the parameter determination module determines the reference signal parameter of the uplink measurement reference signal and/or the downlink measurement reference signal refers to that: the parameter determination module determines the number of the transmitting ports of the uplink measurement reference signal and/or the downlink measurement reference signal according to trade-off of reference signal overhead and performance.

Still another embodiment of the present disclosure provides a terminal, which includes the above-mentioned apparatus.

Still again another embodiment of the present disclosure provides a computer-readable storage medium in which a program instruction is stored. When the program instruction is executed, the above-mentioned method may be implemented.

By means of the solution described in the embodiments of the present disclosure, the base station can configure a more appropriate CSI-RS or SRS for channel information measurement, so the system performance and the resource utilization efficiency may be improved.

DETAILED DESCRIPTION

It needs to be notes that the embodiments of the present disclosure and all features in the embodiments may be combined with each other if no collisions. In addition, although a logic sequence is shown in the flowchart, the shown or described steps may be executed in a sequence different from the sequence here under some circumstances.

Embodiment One

Figure 5:
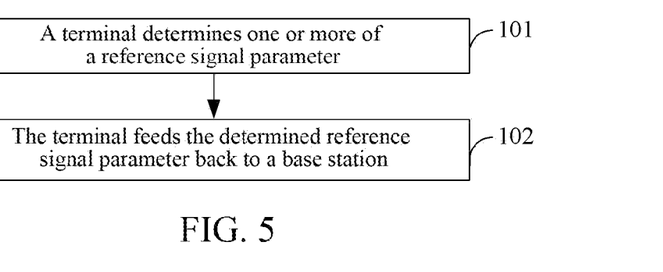
FIG. 5 is a flowchart of a reference signal information feedback method according to embodiment one.

As shown in FIG. 5, the present embodiment describes a reference signal information feedback method, which includes the following steps.

In step 101, a terminal determines a reference signal parameter of an uplink measurement reference signal and/or a downlink measurement reference signal.

In step 102, the terminal feeds the determined reference signal parameter back to a base station.

In the present embodiment, the reference signal parameter may include one or more of the following: a transmitting period or subframe offset of the uplink measurement reference signal and/or the downlink measurement reference signal; a transmitting density of the uplink measurement reference signal and/or the downlink measurement reference signal; a transmitting power of the uplink measurement reference signal and/or the downlink measurement reference signal; a transmitting position of the uplink measurement reference signal and/or the downlink measurement reference signal; a number of transmitting ports of the uplink measurement reference signal and/or the downlink measurement reference signal; port identifier, ID, selection information for transmitting the uplink measurement reference signal and/or the downlink measurement reference signal; precoding information corresponding to a port of the uplink measurement reference signal and/or the downlink measurement reference signal; attribute configuration of a periodic or non-periodic reference signal of the uplink measurement reference signal and/or the downlink measurement reference signal; and attribute configuration of a precoding or non-precoding reference signal of the uplink measurement reference signal or the downlink measurement reference signal.

In an implementation mode of the present embodiment, the transmitting density of the uplink measurement reference signal and/or the downlink measurement reference signal may include: a transmitting density or bandwidth of RB of the uplink measurement reference signal and/or the downlink measurement reference signal; or a transmitting density of the uplink measurement reference signal and/or the downlink measurement reference signal in an RB.

In an implementation mode of the present embodiment, the transmitting position of the uplink measurement reference signal and/or the downlink measurement reference signal may include any one of the following: an RB transmitting position of the uplink measurement reference signal and/or the downlink measurement reference signal; a transmitting position of the uplink measurement reference signal and/or the downlink measurement reference signal in an RB; and a transmitting time domain position of the uplink measurement reference signal and/or the downlink measurement reference signal.

The present embodiment will be illustrated in detail below with several application examples.

Example One

A transmitting period of a periodic reference signal is a very important attribute in the reference signal parameter, which influences the reference signal overhead and the channel measurement performance, and thereby influences the whole system performance. A base station and a terminal appoint a candidate reference signal period configuration as shown in Table 2.

TABLE 2

| Candidate reference signal period configuration | | | | | | |
|---|---|---|---|---|---|---|
| | Config1 | Config2 | Config3 | Config4 | Config5 | Config6 | Config6 |
| Reference signal period | 5 ms | 10 ms | 20 ms | 40 ms | 80 ms | 160 ms | 320 ms |

Or, the base station configures the terminal with a candidate reference signal period configuration set as shown in Table 3. For example, the terminal is configured with one of the following four sets. This mode belongs to a customization mode for a set, saves certain signaling overhead and provides reasonable flexibility.

TABLE 3

| Candidate reference signal period configuration set | | | | |
|---|---|---|---|---|
| | Config1 | Config2 | Config3 | Config4 |
| Set1 | 40 ms | 80 ms | 160 ms | 320 ms |
| Set2 | 10 ms | 20 ms | 40 ms | 80 ms |
| Set3 | 20 ms | 40 ms | 80 ms | 160 ms |
| Set4 | 5 ms | 10 ms | 20 ms | 40 ms |

The terminal performs time-varying channel estimation according to a current movement speed or performs time-varying estimation according to a previous subframe time domain channel varying condition to select an appropriate configuration to feed it back to the base station.

For example, when discovering that the current movement speed is high, the terminal may recommend configuration information corresponding to a transmitting period 5 ms of the base station to the base station; when discovering that the current movement speed is low, the terminal may recommend configuration information corresponding to a period 80 ms to the base station; and when discovering that the current movement speed is almost 0, the terminal may recommend configuration information corresponding to a period 320 ms to the base station.

For another example, when there are high interference and low signal-to-noise ratio at the terminal, a longer period such as 160 ms may be recommended to the base station as the channel information precision is limited by a non-time domain density factor. When the channel condition of the terminal is very good and CSI precision is highly required, a shorter period such as 5 ms may be recommended to the base station.

Feedback recommendation for a transmitting period parameter of the periodic reference signal may be used for a transmitting parameter of an uplink measurement reference signal as well as a transmitting parameter of a downlink measurement reference signal. A configuration signaling may be independent configured, or the same configuration signaling may be used.

The recommended reference signal parameter may be fed back on an uplink data channel in the present example, and is used for a periodic measurement reference signal. The present example is applicable to the uplink measurement reference signal and the downlink measurement reference signal, and is applicable to a precoding measurement reference signal and a non-precoding measurement reference signal.

Example Two

A subframe offset of an uplink or downlink periodic reference signal is also an important attribute in the reference signal parameter, and influences coordination of reference signal interference, such that a measurement reference signal may keep away from a strong interference subframe. A base station and a terminal appoint a candidate reference signal offset configuration as shown in Table 4.

TABLE 4

| Candidate reference signal offset configuration | | | | | |
|---|---|---|---|---|---|
| | Offset1 | Offset2 | Offset3 | Offset4 | Offset5 |
| 5 ms periodic reference signal | subframe 0 | subframe 1 | subframe 2 | subframe 3 | subframe 4 |
| 10 ms periodic reference signal | subframe 0 | subframe 2 | subframe 4 | subframe 6 | subframe 8 |
| 20 ms periodic reference signal | subframe 0 | subframe 4 | subframe 8 | subframe 12 | subframe 16 |
| . . . . . . | . . . | . . . | . . . | . . . | . . . |

The terminal selects an appropriate subframe offset according to a current interference condition and feeds it back to the base station, and the terminal may feed recommended parameters back for an uplink or downlink measurement reference signal respectively. Generally speaking, a selection principle is that the measurement reference signal is transmitted by staggering a strong-interference subframe position.

In the present example, the recommended reference signal parameter may be fed back on an uplink data channel, and is applicable to a periodic measurement reference signal. The present example is applicable to the uplink measurement reference signal and the downlink measurement reference signal, and is applicable to a precoding measurement reference signal and a non-precoding measurement reference signal.

Example Three

A transmitting density of a reference signal is a very important attribute in a reference signal parameter, and influences the reference signal overhead and the channel measurement performance, and thereby influences the whole system performance. A base station and a terminal appoint the following candidate reference signal transmitting density configuration.

Under a condition, transmitting densities of reference signals in all PRB pairs have been determined, and a density parameter configuration needs to configure the PRB pair transmitting density, as shown in Table 5.

TABLE 5

PRB pair density configuration

| | Config1 | Config2 | Config3 | Config5 | Config4 | Config5 |
|---|---|---|---|---|---|---|
| PRB pair density | 0.0625<br>1/16<br>bandwidth | 0.125<br>1/8<br>bandwidth | 0.25<br>1/4<br>bandwidth | 0.333<br>1/3<br>bandwidth | 0.5<br>1/2<br>bandwidth | 1<br>Full<br>bandwidth |

Here, the PRB pair density refers to a ratio of number of RB s to number of RB s in the whole bandwidth, which is 1 maximally.

The terminal may select an appropriate RPB pair density according to a current frequency domain selective fading condition or a related bandwidth and feed it back to the base station, and the terminal may feed recommended parameters back for an uplink or downlink measurement reference signal respectively. Generally speaking, a selection principle is that if the stronger the frequency domain selectivity is, the higher the density of the PRB pair is accordingly, and if the weaker the frequency domain selective fading is, the lower the density of the PRB pair is accordingly.

The recommended reference signal parameter in the present example may be fed back on an uplink data channel, and is applicable to a periodic measurement reference signal and a non-periodic measurement reference signal. The present example is applicable to the uplink measurement reference signal and the downlink measurement reference signal, and is applicable to a precoding measurement reference signal and a non-precoding measurement reference signal.

Example Four

Figure 6:
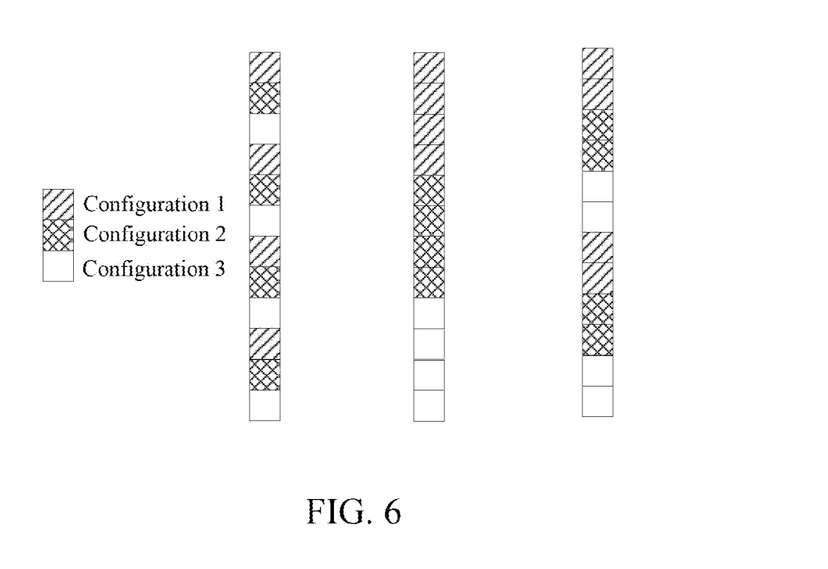
FIG. 6 is a configuration diagram of a PRB pair candidate position in case of ⅓ bandwidth in example four.

For the determined PRB pair density in example 3 such as ⅓ bandwidth, there may be many PRB pair candidate positions which may be configured via a signaling. FIG. 6 shows three configuration solutions, as shown in a left column, a middle column and a right column in FIG. 6, respectively.

The configuration solutions corresponding to FIG. 6 are as shown in Table 6.

TABLE 6

PRB pair position configuration in case of ⅓ bandwidth

| | Config1 | Config2 | Config3 |
|---|---|---|---|
| PRB pair position | RB index Mod 3 = 0 | RB index Mod 3 = 1 | RB index Mod 3 = 2 |
| PRB pair position | RB index 1~M/3 | RB index M/3 + 1~2M/3 | RB index 2M/3 + 1~M |
| PRB pair position | RB index Mod 6 = 0, 1 | RB index Mod 6 = 2, 3 | RB index Mod 6 = 4, 5 |

Figure 7:
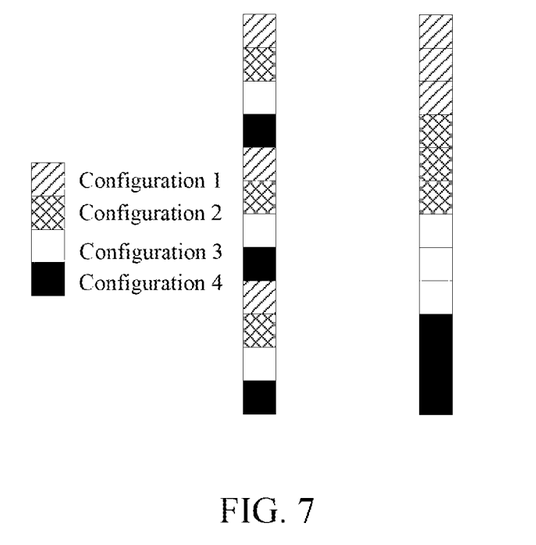
FIG. 7 is a configuration diagram of a PRB pair candidate position in case of ¼ bandwidth in example four.

In case of ¼ bandwidth, there are many PRB pair candidate positions may exist which may be configured via a signaling. FIG. 7 shows two configuration solutions, as shown in a left column and a right column in FIG. 7, respectively.

The configuration solutions corresponding to FIG. 7 are as shown in Table 7.

TABLE 7

PRB pair position configuration in case of ¼ bandwidth

| | Config1 | Config2 | Config3 | Config4 |
|---|---|---|---|---|
| PRB pair position | RB index Mod 4 = 0 | RB index Mod 4 = 1 | RB index Mod 4 = 2 | RB index Mod 4 = 3 |
| PRB pair position | RB index 1~M/4 | RB index M/4 + 1~M/2 | RB index M/2 + 1~3M/4 | RB index 3M/4 + 1~M |

The configuration of PRB pair positions may coordinate frequency domain interference, and the terminal may recommend a low-interference frequency domain position to the base station by means of frequency domain interference analysis.

The recommended reference signal parameter in the present example may be fed back on an uplink data channel, and is applicable to a periodic measurement reference signal and a non-periodic measurement reference signal. The present example is applicable to the uplink measurement reference signal and the downlink measurement reference signal, and is applicable to a precoding measurement reference signal and a non-precoding measurement reference signal.

Example Five

A transmitting density of a reference signal is a very important attribute in a reference signal parameter, and influences the reference signal overhead and the channel measurement performance, and thereby influences the whole system performance. A base station and a terminal appoint the following candidate reference signal transmitting density configuration.

In addition to the condition described in example three, under another condition, a transmitting position of a PRB pair has been determined, but a transmitting density of a reference signal in the PRB pair needs to be configured. At this moment, it is necessary to determine the density of the PRB pair, as shown in Table 8.

TABLE 8

PRB pair density configuration

| | Config1 | Config2 | Config3 | Config4 |
|---|---|---|---|---|
| Density of reference signal in PRB pair | 1 RE/RB/Port | 2 RE/RB | 4 RE/RB | 8 RE/RB |

Here, the unit of the density is RE/RB/Port, that is, the number of REs averagely occupied by each Port in each RB.

The terminal selects an appropriate density of an RE in a RPB pair according to a frequency domain selective fading condition or a related bandwidth and feeds it back to the base station, and the terminal may feed recommended parameters back for an uplink or downlink measurement reference signal respectively. Generally speaking, a selection principle is that if the stronger the frequency domain selectivity is, the higher the density of the RE in the PRB pair is accordingly, and if the weaker the frequency domain selective fading is, the lower the density of the reference signal RE in the PRB pair is accordingly.

In addition, the density increase of the measurement reference signal may suppress noise interference by using correlation, thereby facilitating improvement of the channel estimation performance. Therefore, generally speaking, a selection principle may be that if the poorer the channel condition is, the higher the density of the RE in the PRB pair is accordingly, and if the better the channel condition is, the lower the density of the reference signal RE in the PRB pair is accordingly.

The recommended reference signal parameter in the present example may be fed back on an uplink data channel, and is applicable to a periodic measurement reference signal and a non-periodic measurement reference signal. The present example is applicable to the uplink measurement reference signal and the downlink measurement reference signal, and is applicable to a precoding measurement reference signal and a non-precoding measurement reference signal.

Example Six

A transmitting power of a reference signal is a very important attribute in a reference signal parameter, and influences inter-cell interference, the utilization efficiency of power resources and the channel measurement performance, and thereby influences the whole system performance. A base station and a terminal appoint a candidate reference signal transmitting power configuration as shown in Table 9 and Table 10.

TABLE 9

Downlink measurement reference signal transmitting power configuration

| | Config1 | Config2 | Config3 | Config4 |
|---|---|---|---|---|
| Downlink measurement reference signal transmitting power (relative to downlink data channel) | −3 dB | 0 dB | 3 dB | 6 dB |

TABLE 10

Uplink measurement reference signal transmitting power configuration

| | Config1 | Config2 | Config3 | Config4 |
|---|---|---|---|---|
| Uplink measurement reference signal transmitting power (relative to uplink data channel) | 0 dB | 3 dB | 5 dB | 7 dB |

Here, the unit of the transmitting power offset is dB, and the transmitting power is a relative value, and is respectively a power offset relative to a downlink data channel and an uplink data channel. A power absolute value for the reference signal may be configured for the transmitting power as shown in Table 11 and Table 12.

TABLE 11

Downlink measurement reference signal transmitting power configuration

| | Config1 | Config2 | Config3 | Config4 |
|---|---|---|---|---|
| Downlink measurement reference signal transmitting power | 43 dBm | 40 dBm | 23 dBm | 20 dBm |

TABLE 12

Uplink measurement reference signal transmitting power configuration

| | Config1 | Config2 | Config3 | Config4 |
|---|---|---|---|---|
| Uplink measurement reference signal transmitting power | 23 dBm | 20 dB | 17 dBm | 14 dBm |

The terminal recommends a configuration parameter of a reference signal transmitting power to the base station according to error demands for channel estimation and an interference noise condition. Generally, if better the channel condition is, lower a recommended reference signal transmitting power may be; and if poorer the channel condition is, higher a recommended reference signal transmitting power may be.

The recommended reference signal parameter in the present example may be fed back on an uplink data channel, and is applicable to a periodic measurement reference signal and a non-periodic measurement reference signal. The present example is applicable to the uplink measurement reference signal and the downlink measurement reference signal, and is applicable to a precoding measurement reference signal and a non-precoding measurement reference signal.

Example Seven

A transmitting position of a reference signal in a PRB pair is an important attribute in a reference signal parameter, and influences a reference signal interference condition. A base station and a terminal appoint a candidate transmitting position of a reference signal in a PRB pair, as shown in Table 13.

TABLE 13

Transmitting position configuration in PRB pair

| | Config1 | Config2 | Config3 | Config4 |
|---|---|---|---|---|
| Transmitting position in PRB pair | Pattern1 | Pattern2 | Pattern3 | Pattern4 |

Here, patterns 1, 2, 3 and 4 are determined by negotiation between the base station and the terminal, or may be patterns having other numbers.

The configuration of the transmitting position of the reference signal in the PRB pair may coordinate interference, and the terminal may recommend a pattern corresponding to a low-interference position to the base station by means of interference analysis.

The recommended reference signal parameter in the present example may be fed back on an uplink data channel, and is applicable to a periodic measurement reference signal and a non-periodic measurement reference signal. The present example is applicable to the uplink measurement reference signal and the downlink measurement reference signal, and is applicable to a precoding measurement reference signal and a non-precoding measurement reference signal.

Example Eight

A reference signal transmitting subframe of a non-periodic reference signal is an important attribute in a reference signal parameter, and influences the interference coordination performance, the channel estimation performance and the requirement on a CSI calculation capability of a terminal. A base station and the terminal appoint a candidate reference signal time domain position configuration as shown in Table 14.

TABLE 14

| Reference signal time domain position configuration | | | | | | | | |
|---|---|---|---|---|---|---|---|---|
| | Config1 | Config2 | Config3 | Config4 | Config5 | Config6 | Config7 | Config8 |
| Reference signal delay relative to trigger signaling subframe | 1 ms | 2 ms | 3 ms | 4 ms | 5 ms | 6 ms | 8 ms | 10 ms |

Here, a time domain position of the non-periodic reference signal is appointed according to a reference signal delay relative to a trigger signaling subframe.

The terminal performs time-varying channel estimation according to a current movement speed, or performs time-varying estimation according to a previous subframe time domain channel varying condition to select an appropriate configuration to feed it back to the base station.

For example, when discovering that the current movement speed is relatively high, the terminal may recommend configuration information corresponding to a reference signal delay relative to a trigger signaling subframe 2 ms to the base station; when discovering that the current movement speed is relatively low, the terminal may recommend configuration information corresponding to a delay 5 ms to the base station; and when discovering that the current movement speed is almost 0, the terminal may recommend configuration information corresponding to a delay 10 ms to the base station.

In addition to consideration of the movement speed, it also takes time for the terminal to perform channel estimation on a detection reference signal and quantization calculation on channel information, and different terminals have different processing capabilities. Therefore, the terminal needs to consider a time varying speed of a channel as well as a calculation capability of the terminal to recommend a transmitting subframe position of a non-periodic reference signal, such that the problem of insufficient processing time is avoided.

Feedback recommendation of a trigger subframe position parameter of the non-periodic reference signal may be used for a transmitting parameter of an uplink reference signal as well as a transmitting parameter of a downlink reference signal. The transmitting parameter of an uplink reference signal and the transmitting parameter of a downlink reference signal may be independent configured, or may use the same configuration signaling.

The recommended reference signal parameter in the present example may be fed back on an uplink data channel, and is applicable to a non-periodic measurement reference signal. The present example is applicable to an uplink measurement reference signal and a downlink measurement reference signal, and is applicable to a precoding measurement reference signal and a non-precoding measurement reference signal.

Example Nine

Number of ports for transmitting a non-periodic reference signal and a periodic reference signal is an important attribute in a reference signal parameter, and influences the reference signal overhead and the channel measurement performance, and thereby influences the whole system performance. A base station and a terminal appoint a candidate reference signal port number configuration as shown in Table 15.

TABLE 15

| Reference signal port number configuration | | | | | | | |
|---|---|---|---|---|---|---|---|
| | Config1 | Config2 | Config3 | Config4 | Config5 | Config6 | Config7 |
| Number of Periodic reference signal ports | 1 Port | 2 Port | 4 Port | 8 Port | 16 Port | 32 Port | 64 Port |

The terminal mainly considers the bottleneck of a current channel quantization precision for recommendation of the number of ports for the reference signal. If the feedback precision demand of a high-dimensional antenna port cannot be met so as to cause that the high-dimensional precoding performance is not advantageous relative to the low-dimensional precoding performance due to the presence of a large multiplicative receiving noise or other CSI quantization precision shortages, the terminal may recommend an appropriate low-dimensional port number matched therewith to the base station to avoid over-large reference signal overhead.

Another condition is that a system uses a dimensionality reduction reference signal technology. The terminal may estimate high-dimensional channel information according to a small amount of low-dimensional reference signal resources, and the terminal may recommend an appropriate reference signal port number to the base station to obtain trade-off of overhead and performance.

The terminal also needs to give a recommended port ID to feed back to the base station generally under this circumstance, such as shown in Table 16.

TABLE 16

Reference signal port ID configuration

| | Config1 | Config2 | Config3 | Config4 |
|---|---|---|---|---|
| The number of total ports is 16, and the number of feedback recommended ports is 4 | Port 0, 1, 2, 3 | Port 4, 5, 6, 7 | Port 8, 9, 10, 11 | Port 12, 13, 14, 15 |

| | Config1 | Config2 | Config3 | Config4 |
|---|---|---|---|---|
| The number of total ports is 16, and the number of feedback recommended ports is 4 | Port 0, 4, 8, 12 | Port 1, 5, 9, 13 | Port 2, 6, 10, 14 | Port 3, 7, 11, 15 |

The recommended reference signal parameter in the present example may be fed back on an uplink data channel, and is applicable to a periodic measurement reference signal and a non-periodic measurement reference signal. The present example is applicable to an uplink measurement reference signal and a downlink measurement reference signal, and is applicable to a precoding measurement reference signal and a non-precoding measurement reference signal.

Example Ten

Attribute information of a non-periodic reference signal and a periodic reference signal is an important attribute in a reference signal parameter, and influences the reference signal overhead, the channel measurement performance and the signaling overhead, and thereby influences the whole system performance. A base station and a terminal appoint a candidate reference signal attribute configuration as shown in Table 17.

TABLE 17

Reference signal attribute configuration

| | Config1 | Config2 |
|---|---|---|
| Reference signal attribute | Periodic reference signal | Non-periodic reference signal |

Generally speaking, the periodic reference signal does not need a physical layer control signaling, and has a long duration, and does not need a physical layer control signaling resource. During measurement, noise interference may be suppressed by using the time domain correlation of the periodic reference signal to improve the performance. However, the biggest problem is large reference signal overhead which lead to large waste.

The non-periodic reference signal does not need a physical layer control signaling, and has good real-time performance and high reference signal resource utilization rate. However, the overhead of the control signaling is large. More signaling is needed for parameter configuration and trigger of the non-periodic reference signal.

The terminal may consider recommending a more appropriate reference signal attribute to the base station on an uplink channel.

Example Eleven

Attribute information of a precoding reference signal and a non-precoding reference signal is an important attribute in a reference signal parameter, and influences the reference signal overhead, the channel measurement performance and the signaling overhead, and thereby influences the whole system performance. A base station and a terminal appoint a candidate reference signal attribute configuration as shown in Table 18.

TABLE 18

Reference signal attribute configuration

| | Config1 | Config2 |
|---|---|---|
| Reference signal attribute | Precoding reference signal | Non-precoding reference signal |

Generally speaking, the performance of the precoding reference signal is good for terminals capable of being covered, i.e., the reference signal resource utilization rate is high, but the problem of terminal coverage hole easily appears. Out of a beam reference signal coverage range, the situation that the measurement cannot be performed will probably occur. The performance of the non-precoding reference signal is poor, the resource utilization rate thereof is not high, but a general coverage range is relatively wide.

The terminal may recommend to select the precoding reference signal or the non-precoding reference signal to use according to a situation that whether the channel is matched with the precoding reference signal.

If the terminal is out of the coverage range of the precoding reference signal and it is expected to use the precoding reference signal, the terminal shall recommend one or more precoding reference signal weights capable of covering the terminal to the base station.

Embodiment Two

Figure 8:
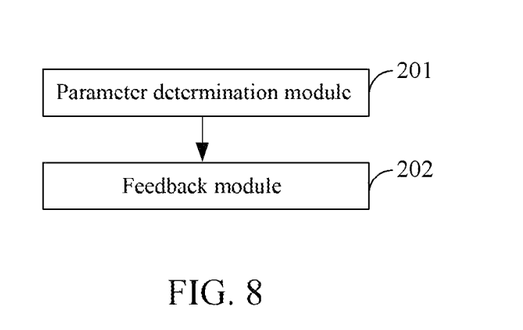
FIG. 8 is a structural diagram of a reference signal information feedback apparatus according to embodiment two.
Figure 9:
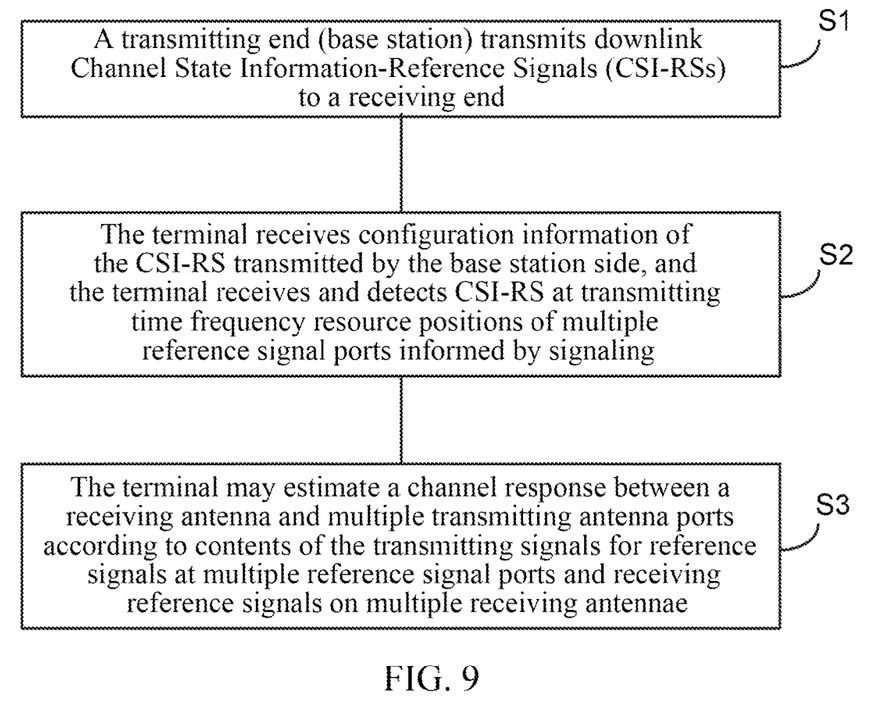
FIG. 9 is a flowchart of acquiring downlink channel information of a FDD system.
Figure 10:
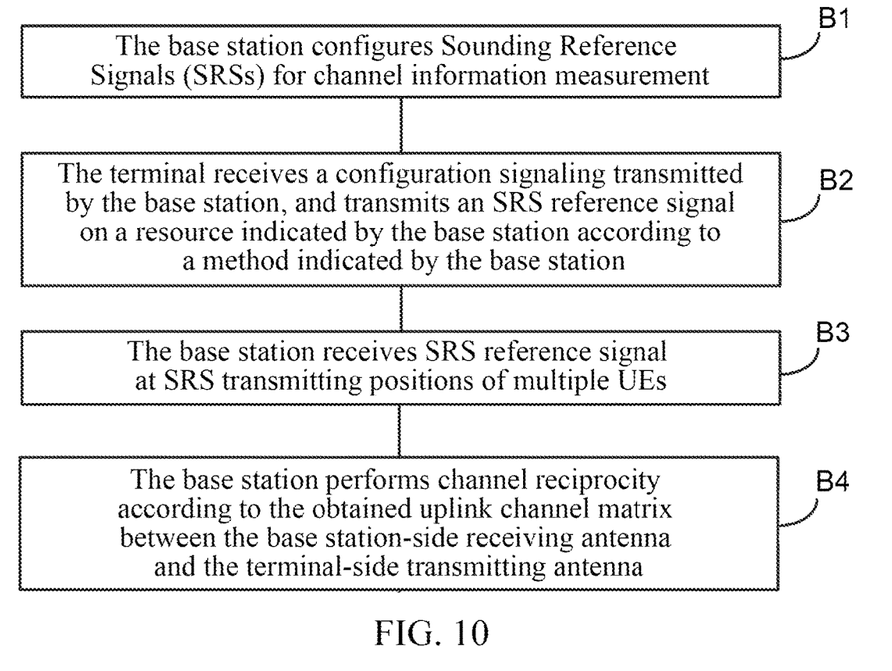
FIG. 10 is a flowchart of acquiring downlink channel information of a TDD system.

The present embodiment describes a reference signal information feedback apparatus, which is arranged on a terminal and includes a parameter determination module 201 and a feedback module 202 as shown in FIG. 8.

The parameter determination module 201 is arranged to determine a reference signal parameter of an uplink measurement reference signal and/or a downlink measurement reference signal.

The feedback module 202 is arranged to feed the determined reference signal parameter back to a base station.

In the present embodiment, the reference signal parameter may include one or more of the following: a transmitting period or subframe offset of the uplink measurement reference signal and/or the downlink measurement reference signal; a transmitting density of the uplink measurement reference signal and/or the downlink measurement reference signal; a transmitting power of the uplink measurement reference signal and/or the downlink measurement reference signal; a transmitting position of the uplink measurement reference signal and/or the downlink measurement reference signal; a number of transmitting ports of the uplink measurement reference signal and/or the downlink measurement reference signal; port identifier selection information for transmitting the uplink measurement reference signal and/or the downlink measurement reference signal; precoding information corresponding to a port of the uplink measurement reference signal and/or the downlink measurement reference signal; attribute configuration of a periodic or non-periodic reference signal of the uplink measurement reference signal and/or the downlink measurement reference signal; and attribute configuration of a precoding or non-precoding reference signal of the uplink measurement reference signal or the downlink measurement reference signal.

In an implementation mode of the present embodiment, the transmitting density of the uplink measurement reference signal and/or the downlink measurement reference signal may include: a transmitting density or bandwidth of RBs of the uplink measurement reference signal and/or the downlink measurement reference signal; or a transmitting density of the uplink measurement reference signal and/or the downlink measurement reference signal in an RB.

In the present implementation mode, when the reference signal parameter includes the transmitting density of the uplink measurement reference signal and/or the downlink measurement reference signal, the operation that the parameter determination module 201 determines the reference signal parameter of the uplink measurement reference signal and/or the downlink measurement reference signal refers to that:

the parameter determination module 201 selects a density of a PRB pair or density of an RE in the PRB pair according to a current frequency selective fading condition or a related bandwidth.

In an implementation mode of the present embodiment, the transmitting position of the uplink measurement reference signal and/or the downlink measurement reference signal includes any one of the following: an RB transmitting position of the uplink measurement reference signal and/or the downlink measurement reference signal; a transmitting position of the uplink measurement reference signal and/or the downlink measurement reference signal in an RB; and a transmitting time domain position of the uplink measurement reference signal and/or the downlink measurement reference signal.

In the present implementation mode, when the reference signal parameter includes the transmitting time domain position of the uplink measurement reference signal and/or the downlink measurement reference signal, the operation that the parameter determination module 201 determines the reference signal parameter of the uplink measurement reference signal and/or the downlink measurement reference signal refers to that:

the parameter determination module 201 determines a transmitting subframe position of a non-periodic reference signal according to a time varying speed of a channel and/or calculation capability of the parameter determination module 201.

In an implementation mode of the present embodiment, when the reference signal parameter includes the subframe offset and/or transmitting position of the uplink measurement reference signal and/or the downlink measurement reference signal, the operation that the parameter determination module 201 determines the reference signal parameter of the uplink measurement reference signal and/or the downlink measurement reference signal refers to that: the parameter determination module 201 determines a low-interference reference signal parameter in alternative reference signal parameters of the uplink measurement reference signal and/or the downlink measurement reference signal according to a channel interference condition.

In an implementation mode of the present embodiment, when the reference signal parameter includes the transmitting period of the uplink measurement reference signal and/or the downlink measurement reference signal, the operation that the parameter determination module 201 determines the reference signal parameter of the uplink measurement reference signal and/or the downlink measurement reference signal refers to that:

the parameter determination module 201 determines the transmitting period of the uplink measurement reference signal and/or the downlink measurement reference signal according to a current movement speed or signal-to-noise ratio.

In an implementation mode of the present embodiment, when the reference signal parameter includes the transmitting power of the uplink measurement reference signal and/or the downlink measurement reference signal, the operation that the parameter determination module 201 determines the reference signal parameter of the uplink measurement reference signal and/or the downlink measurement reference signal refers to that:

the parameter determination module determines the reference signal parameter of the uplink measurement reference signal and/or the downlink measurement reference signal according to a channel condition.

In an implementation mode of the present embodiment, when the reference signal parameter includes the number of ports for transmitting the uplink measurement reference signal and/or the downlink measurement reference signal, the operation that the parameter determination module 201 determines the reference signal parameter of the uplink measurement reference signal and/or the downlink measurement reference signal refers to that:

the parameter determination module 201 determines the number of ports for transmitting the uplink measurement reference signal and/or the downlink measurement reference signal according to trade-off of reference signal overhead and performance.

Embodiment Three

The present embodiment provides a terminal, which includes the apparatus in embodiment two. Please refer to the description in embodiment two, and the terminal will not be elaborated here.

Those ordinary skilled in the art may understand that all or some steps in the above-mentioned method may be completed by instructing relevant hardware via a program. The program may be stored in a computer-readable storage medium such as a read-only memory, a magnetic disk or an optical disc or the like. In an exemplary embodiment, all or some steps in the above-mentioned embodiments may be implemented by using one or more integrated circuits. Correspondingly, each module/unit in the above-mentioned embodiments may be implemented in a hardware form or may be implemented in a software function module form.

INDUSTRIAL APPLICABILITY

By means of the solution in the embodiments of the present disclosure, the base station can configure a more appropriate CSI-RS or SRS for channel information measurement, therefore the system performance and the resource utilization efficiency can be improved.

What is claimed is:
1. A reference signal information feedback method, comprising:
determining, by a terminal served by a base station, a reference signal parameter of an uplink measurement reference signal or a reference signal parameter of a downlink measurement reference signal or reference signal parameters of an uplink measurement reference signal and a downlink measurement reference signal; and transmitting, by the terminal, the determined reference signal parameter to the base station, wherein the reference signal parameter comprises one or more of the following:

a transmitting period or subframe offset of the uplink measurement reference signal or the downlink measurement reference signal or the uplink measurement reference signal and downlink measurement reference signal;

a transmitting density of the uplink measurement reference signal or the downlink measurement reference signal or the uplink measurement reference signal and the downlink measurement reference signal; and a transmitting position of the uplink measurement reference signal or the downlink measurement reference signal or the uplink measurement reference signal and the downlink measurement reference signal, wherein the transmitting density of the uplink measurement reference signal or the downlink measurement reference signal or the uplink measurement reference signal and the downlink measurement reference signal comprises:

a transmitting density or a Physical Resource Block, PRB, pair density of a Resource Block, RB, of the uplink measurement reference signal or the downlink measurement reference signal or the uplink measurement reference signal and the downlink measurement reference signal; or, a transmitting density of the uplink measurement reference signal in an RB or the downlink measurement reference signal in an RB or the uplink measurement reference signal and the downlink measurement reference signal in an RB, wherein when the reference signal parameter comprises the subframe offset or transmitting position or subframe offset and transmitting position of the uplink measurement reference signal or the downlink measurement reference signal or the uplink measurement reference signal and the downlink measurement reference signal, the step that the terminal determines the reference signal parameter of the uplink measurement reference signal or the downlink measurement reference signal or the uplink measurement reference signal and the downlink measurement reference signal comprises:

determining, by the terminal, a low-interference reference signal parameter in alternative subframe offsets or transmitting positions or subframe offsets and transmitting positions of the uplink measurement reference signal or the downlink measurement reference signal or the uplink measurement reference signal and the downlink measurement reference signal according to a channel interference condition;

or when the reference signal parameter comprises the transmitting period of the uplink measurement reference signal or the downlink measurement reference signal or the uplink measurement reference signal and the downlink measurement reference signal, the step that the terminal determines the reference signal parameter of the uplink measurement reference signal or the downlink measurement reference signal or the uplink measurement reference signal and the downlink measurement reference signal comprises:

determining, by the terminal, the transmitting period of the uplink measurement reference signal or the downlink measurement reference signal or the uplink measurement reference signal and the downlink measurement reference signal according to a current movement speed or signal-to-noise ratio.

2. The method according to claim 1, wherein the transmitting position of the uplink measurement reference signal or the downlink measurement reference signal or the uplink measurement reference signal and the downlink measurement reference signal comprises any one of the following:

a transmitting position of the uplink measurement reference signal in an RB or the downlink measurement reference signal in an RB or the uplink measurement reference signal and the downlink measurement reference signal in an RB; and a transmitting time domain position of the uplink measurement reference signal or the downlink measurement reference signal or the uplink measurement reference signal and the downlink measurement reference signal.

3. The method according to claim 1, wherein when the reference signal parameter comprises the transmitting density of the uplink measurement reference signal or the downlink measurement reference signal or the uplink measurement reference signal and the downlink measurement reference signal, the step that the terminal determines the reference signal parameter of the uplink measurement reference signal or the downlink measurement reference signal or the uplink measurement reference signal and the downlink measurement reference signal comprises:

selecting, by the terminal, a density of a Physical Resource Block, PRB, pair or density of a Resource Element, RE, in the PRB pair according to a current frequency selective fading condition or a related bandwidth.

4. The method according to claim 2, wherein when the reference signal parameter comprises the transmitting time domain position of the uplink measurement reference signal or the downlink measurement reference signal or the uplink measurement reference signal and the downlink measurement reference signal, the step that the terminal determines the reference signal parameter of the uplink measurement reference signal or the downlink measurement reference signal or the uplink measurement reference signal and the downlink measurement reference signal comprises:

determining, by the terminal, a transmitting subframe position of the non-periodic reference signal according to a time varying speed of a channel or calculation capability of the terminal or a time varying speed of a channel and calculation capability of the terminal.

5. A reference signal information feedback apparatus, arranged on a terminal served by a base station, and the apparatus comprising:

a parameter determination module, arranged to determine a reference signal parameter of an uplink measurement reference signal or a downlink measurement reference signal or an uplink measurement reference signal and a downlink measurement reference signal; and a feedback module, arranged to transmit the determined reference signal parameter to the base station, wherein the reference signal parameter comprises one or more of the following:

a transmitting period or subframe offset of the uplink measurement reference signal or the downlink measurement reference signal or the uplink measurement reference signal and the downlink measurement reference signal;

a transmitting density of the uplink measurement reference signal or the downlink measurement reference signal or the uplink measurement reference signal and the downlink measurement reference signal; and a transmitting position of the uplink measurement reference signal or the downlink measurement reference signal or the uplink measurement reference signal and the downlink measurement reference signal, wherein the transmitting density of the uplink measurement reference signal or the downlink measurement reference signal or the uplink measurement reference signal and the downlink measurement reference signal comprises:

a transmitting density or a Physical Resource Block, PRB, pair density of a Resource Block, RB, of the uplink measurement reference signal or the downlink measurement reference signal or the uplink measurement reference signal and the downlink measurement reference signal; or, a transmitting density of the uplink measurement reference signal in an RB or the downlink measurement reference signal in an RB or the uplink measurement reference signal and the downlink measurement reference signal in an RB, wherein when the reference signal parameter comprises the subframe offset or transmitting position or subframe offset and transmitting position of the uplink measurement reference signal or the downlink measurement reference signal or the uplink measurement reference signal and the downlink measurement reference signal, determining, by the parameter determination module, the reference signal parameter of the uplink measurement reference signal or the downlink measurement reference signal or the uplink measurement reference signal and the downlink measurement reference signal refers to:

determining, by the parameter determination module, a low-interference reference signal parameter in alternative subframe offsets or transmitting positions or subframe offsets and transmitting positions of the uplink measurement reference signal or the downlink measurement reference signal or the uplink measurement reference signal and the downlink measurement reference signal according to a channel interference condition;

or when the reference signal parameter comprises the transmitting period of the uplink measurement reference signal or the downlink measurement reference signal or the uplink measurement reference signal and the downlink measurement reference signal, determining, by the parameter determination module, the reference signal parameter of the uplink measurement reference signal or the downlink measurement reference signal or the uplink measurement reference signal and the downlink measurement reference signal refers to:

determining, by the parameter determination module, the transmitting period of the uplink measurement reference signal or the downlink measurement reference signal or the uplink measurement reference signal and the downlink measurement reference signal according to a current movement speed or signal-to-noise ratio.

6. The apparatus according to claim 5, wherein the transmitting position of the uplink measurement reference signal or the downlink measurement reference signal or the uplink measurement reference signal and the downlink measurement reference signal comprises any one of the following:

a transmitting position of the uplink measurement reference signal in an RB or the downlink measurement reference signal in an RB or the uplink measurement reference signal and the downlink measurement reference signal in an RB; and a transmitting time domain position of the uplink measurement reference signal or the downlink measurement reference signal or the uplink measurement reference signal and the downlink measurement reference signal.

7. The apparatus according to claim 5, wherein when the reference signal parameter comprises the transmitting density of the uplink measurement reference signal or the downlink measurement reference signal or the uplink measurement reference signal and the downlink measurement reference signal, determining, by the parameter determination module, the reference signal parameter of the uplink measurement reference signal or the downlink measurement reference signal or the uplink measurement reference signal and the downlink measurement reference signal refers to:

selecting, by the parameter determination module, a density of a Physical Resource Block, PRB, pair or density of a Resource Element, RE, in the PRB pair according to a current frequency selective fading condition or a related bandwidth.

8. The apparatus according to claim 6, wherein when the reference signal parameter comprises the transmitting time domain position of the uplink measurement reference signal or the downlink measurement reference signal or the uplink measurement reference signal and the downlink measurement reference signal, determining, by the parameter determination module, the reference signal parameter of the uplink measurement reference signal or the downlink measurement reference signal or the uplink measurement reference signal and the downlink measurement reference signal refers to:

determining, by the parameter determination module, a transmitting subframe position of the non-periodic reference signal according to a time varying speed of a channel or calculation capability of the parameter determination module or a time varying speed of a channel and calculation capability of the parameter determination module.

9. A terminal, comprising the apparatus according to claim 5.

10. A non-transitory computer-readable storage medium in which a program instruction is stored, wherein, when the program instruction is executed, the method according to claim 1 may be implemented.

* * * * *